US012809557B2

(12) United States Patent
Chang

(10) Patent No.: US 12,809,557 B2
(45) Date of Patent: Nov. 24, 2026

(54) METHOD FOR EMULATING ELECTRICALLY-ERASABLE PROGRAMMABLE READ-ONLY MEMORY BY USING FLASH MEMORY AND FLASH MEMORY SYSTEM USING THE SAME

(71) Applicant: NUVOTON TECHNOLOGY CORPORATION, Hsinchu City (TW)

(72) Inventor: Wen-Shuo Chang, Zzhubei City (TW)

(73) Assignee: NUVOTON TECHNOLOGY CORPORATION, Hsinchu City (TW)

( * ) Notice: Subject to any disclaimer, the term of this patent is extended or adjusted under 35 U.S.C. 154(b) by 0 days.

(21) Appl. No.: 18/739,900

(22) Filed: Jun. 11, 2024

(65) Prior Publication Data

US 2025/0036320 A1 Jan. 30, 2025

(30) Foreign Application Priority Data

Jul. 27, 2023 (TW) ................................ 112128245

(51) Int. Cl.
*G06F 3/06* (2006.01)

(52) U.S. Cl.
CPC .......... *G06F 3/0664* (2013.01); *G06F 3/0604* (2013.01); *G06F 3/0679* (2013.01)

(58) Field of Classification Search
CPC .... G06F 3/0664; G06F 3/0604; G06F 3/0679; G11C 16/14
See application file for complete search history.

(56) References Cited

U.S. PATENT DOCUMENTS

2008/0301357 A1* 12/2008 La Rosa .............. G11C 16/225 711/E12.008
2010/0250875 A1* 9/2010 Leung .................. G11C 16/102 711/155
2010/0293320 A1* 11/2010 Li ....................... G06F 12/0246 711/E12.001

* cited by examiner

*Primary Examiner* — Hosain T Alam
*Assistant Examiner* — Subir Kumar Chowdhury
(74) *Attorney, Agent, or Firm* — MUNCY, GEISSLER, OLDS & LOWE, P.C.

(57) ABSTRACT

A method for emulating electrically-erasable programmable read-only memory and a flash memory system are disclosed. The flash memory system includes a control circuit and a flash memory. Each unit of the flash memory is divided into a data field and an address field. A plurality of units are allocated as a first page. When the control circuit receives an instruction to read a specific storage unit of the sector, it determines, starting from an initial unit of an initial page, whether the address field of the unit has been written; when the address field has been written, finding a next address according to the address field until a target unit with an address field that has not been written is found. The control circuit reads the data field of the target unit.

10 Claims, 5 Drawing Sheets

METHOD FOR EMULATING ELECTRICALLY-ERASABLE PROGRAMMABLE READ-ONLY MEMORY BY USING FLASH MEMORY AND FLASH MEMORY SYSTEM USING THE SAME

CROSS-REFERENCE TO RELATED APPLICATION

This application claims the priority from the TW Patent Application No. 112128245, filed on Jul. 27, 2023, and all contents of such TW Patent Application are included in the present invention.

BACKGROUND

1. Field of the Invention

The present invention is related to flash memory technology, in particular to, a method for emulating electrically-erasable programmable read-only memory by using a flash memory and a flash memory system using the same.

2. Description of the Related Art

Electrically-erasable programmable read-only memory (EEPROM) was first introduced by Intel in 1978 as a replacement for traditional read-only memory (ROM). The unit of electrically-erasable programmable read-only memory is a byte. Besides, read and write operations of electrically-erasable programmable read-only memory are performed individually and required to be performed on each byte. Since the read and write operations of electrically-erasable programmable read-only memory require frequent erase and write operations, electrically-erasable programmable read-only memory generally can support one hundred thousand times to one million times of read and write cycles.

Flash Memory was introduced by the Japanese company Toshiba in 1988. It was mainly developed to address the long write time of electrically-erasable programmable read-only memory. The write speed of electrically-erasable programmable read-only memory is slower than that of flash Memory, generally requiring approximately 4 milliseconds. However, some applications of micro control units (MCUs) require simulating/emulating the operations of electrically-erasable programmable read-only memory. In addition to the characteristic of reading and writing in units of 1 byte or 2 bytes, electrically-erasable programmable read-only memory may also write directly. In contrast, conventional flash memory requires erasing the entire page of data before writing, and thus does not have the random access characteristics of electrically-erasable programmable read-only memory.

SUMMARY

The present disclosure provides a method for emulating electrically-erasable programmable read-only memory by using a flash memory and a flash memory system using the same. According to the address characteristics of flash memory and electrically-erasable programmable read-only memory, the provided method and flash memory system installed with a control method enable the flash memory to achieve a random access manner similar to that of electrically-erasable programmable read-only memory.

Embodiments of the present disclosure provide a method for emulating electrically-erasable programmable read-only memory by using a flash memory, adapted for emulating rewritable electrically-erasable programmable read-only memory in the flash memory, the method comprising: dividing each of units of the flash memory into a data field and an address field; allocating a part of the units as a first page in a sector; wherein in response to an instruction to write data into a specific storage address of the sector, the method comprises: determining, starting from an initial unit of an initial page of the sector, whether one of the address fields of the units has been written; when the one of the address fields is in a written state, finding a next unit based on the one of the address fields until a final unit is found, wherein an address field of the final unit has not been written; finding a writable unit, wherein both a data field and an address field of the writable unit have not been written; and writing the data into the data field of the writable unit and writing the address field of the final unit into the address of the writable unit.

Embodiments of the present disclosure provide a flash memory system, comprising: a control circuit; and a flash memory, each of units of the flash memory being divided into a data field and an address field, and a part of the units being allocated as a first page in a sector, wherein: when the control circuit receives an instruction to read a specific storage address of the sector, the control circuit determines, starting from an initial unit of an initial page of the sector, whether one of the address fields of the units has been written; when the control circuit determines that the one of the address fields is in a written state, the control circuit finds a next unit based on the one of the address fields until a final unit is found, wherein an address field of the final unit has not been written; and the control circuit reads the data field of the final unit.

According to preferred embodiments of the present disclosure, wherein in response to an instruction to read a specific storage address of the sector, the method comprises: determining, starting from an initial unit of an initial page of the sector, whether one of the address fields of the units has been written; when the one of the address fields is in a written state, finding a next unit based on the one of the address fields until a target unit is found, wherein an address field of the target unit has not been written; and reading a data field of the target unit.

According to preferred embodiments of the present disclosure, the method comprises: allocating at least one second page in the sector; wherein in response to the instruction to write the specific storage address of the sector, the method further comprises: when the first page is fully stored, finding a unit of the second page, wherein an address field of the unit of the second page has not been written; and writing a data field of the found unit of the second page.

Embodiments of the present disclosure provide a method for emulating electrically-erasable programmable read-only memory by using a flash memory, adapted for emulating rewritable electrically-erasable programmable read-only memory in the flash memory, the method comprising: dividing each of units of the flash memory into a data field and an address field; allocating a part of the units as a first page in a sector; wherein in response to an instruction to read a specific storage address of the sector, the method comprises: determining, starting from an initial unit of the first page of the sector, whether one of the address fields of the units has been written; when the one of the address fields is in a written state, finding a next address based on the one of the address fields until a target unit is found, wherein an address field of the target unit has not been written; and reading the data field of the target unit.

To sum up, the embodiments of the present disclosure adopt, in flash memory, that the partition scheme originally used for electrically-erasable programmable read-only memory is applied in the addressing scheme of flash memory and that one data field and one address pointer field are allocated in each writable unit. When the address pointer field is in a written state, it represents that the data in the data field is not the latest written data. In this situation, it only requires continuously searching for the address of the address pointer field until a unit is found. The situation that the address pointer field of this unit has not been written represents that the data in the data field of this unit is the latest data. This allows emulating the memory allocation of electrically-erasable programmable read-only memory while reducing the number of times to erase the entire page in the flash memory, thereby extending its lifespan.

To further understand the technology, means, and effects of the present disclosure, reference may be made by the detailed description and drawing as follows. Accordingly, the purposes, features and concepts of the present disclosure can be thoroughly and concretely understood. However, the following description and drawings are only used to reference and illustrate the implementation of the present disclosure, and they are not used to limit the present disclosure.

BRIEF DESCRIPTION OF THE DRAWINGS

The drawings are provided to make the persons with ordinary knowledge in the field of the art further understand the present disclosure, and are incorporated into and constitute a part of the specification of the present invention. The drawings illustrate demonstrated embodiments of the present disclosure, and are used to explain the principle of the present disclosure together with the description of the present disclosure.

DESCRIPTION OF THE PREFERRED EMBODIMENTS

Figure 1:
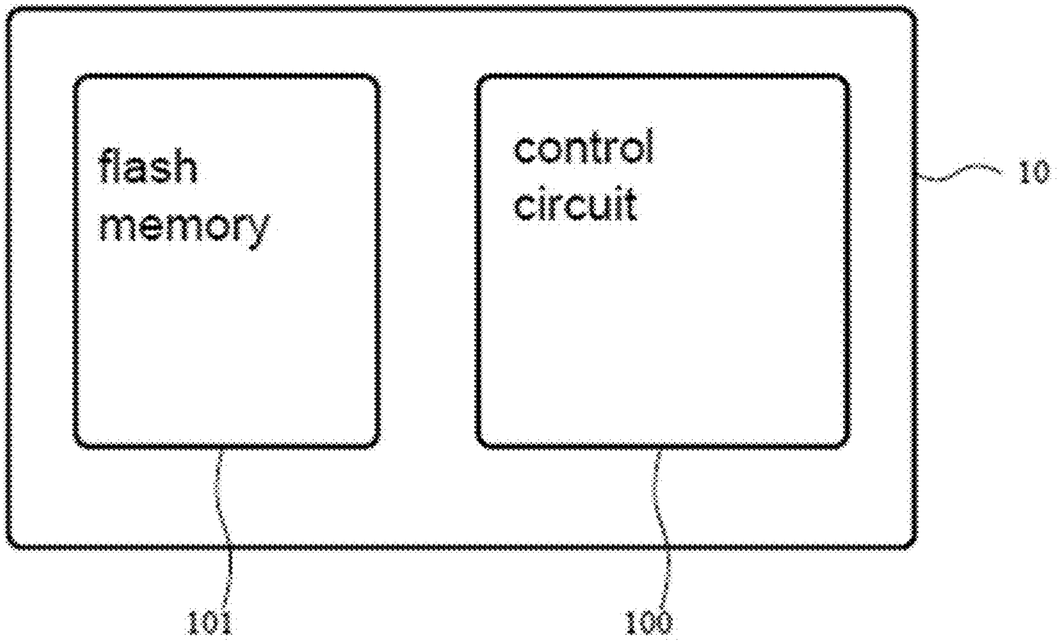
FIG. 1 is a schematic system block diagram illustrating a flash memory system according to an embodiment of the present disclosure.

In order to make the features and advantages of the present disclosure more obvious and comprehensible, preferred embodiments accompanied with drawings are described in detail below. The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

FIG. 1 is a schematic system block diagram illustrating a flash memory system according to an embodiment of the present disclosure. Referring to FIG. 1, the flash memory system is, for example, a single chip microcontroller 10. The flash memory system includes a control circuit 100 and a flash memory 101. In this embodiment, the flash memory 101 is adopted for emulating electrically erasable programmable read-only memory. Flash memory has certain advantages over electrically-erasable programmable read-only memory in terms of price and capacity. Firstly, the price of flash memory is relatively low. This is mainly because the manufacturing process of flash memory is simpler than that of electrically-erasable programmable read-only memory, resulting in lower production costs. Besides, an increase in production scale leads to a reduction in the price of flash memory. Secondly, the capacity of flash memory is relatively large. The storage density of flash memory is higher than that of electrically-erasable programmable read-only memory, meaning that flash memory can store more data in the same chip area, thereby increasing the storage capacity. Additionally, flash memory can have multiple sectors simultaneously, and thus the storage capacity is larger.

However, certain special applications may require flexible read and write operations and a smaller capacity. In this case, read and write capabilities of electrically-erasable programmable read-only memory may still be applied to the product. Thus, in this embodiment, the characteristics of the flash memory 101 are used to avoid the number of times to erase the entire page for random access.

Figure 2:
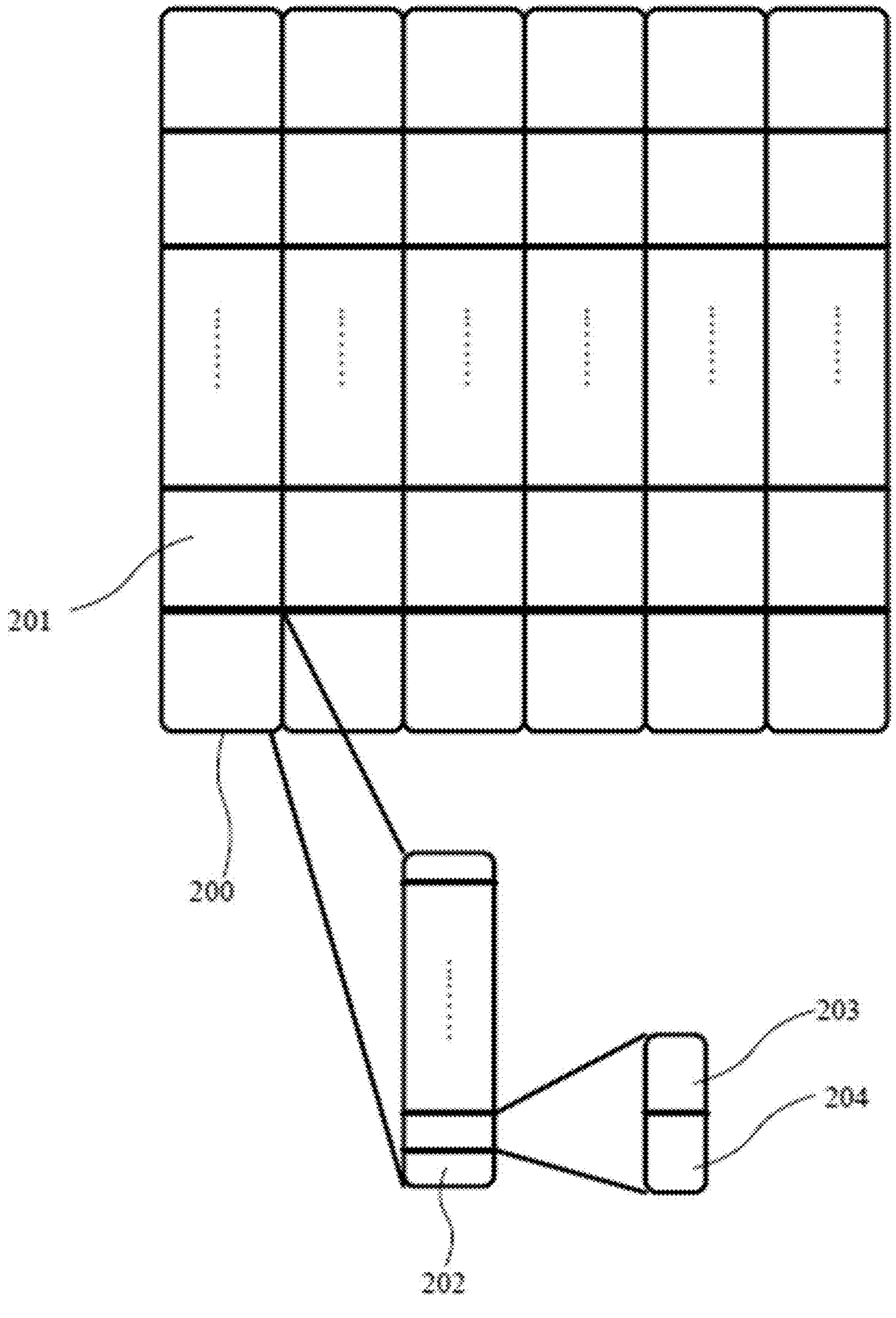
FIG. 2 is a schematic configuration diagram illustrating a storage block of the flash memory 101 according to an embodiment of the present disclosure.

FIG. 2 is a schematic configuration diagram illustrating a storage block of the flash memory 101 according to an embodiment of the present disclosure. Referring to FIG. 2, the flash memory 101 is, for example, a NAND flash memory. The flash memory 101 includes multiple sectors 200. Each sector 200 includes multiple pages 201. Each page 201 includes, for example, 16 units 202. Each unit 202 includes a data field 203 and an address field 204. In this embodiment, each unit has 32 bits.

Figure 3:
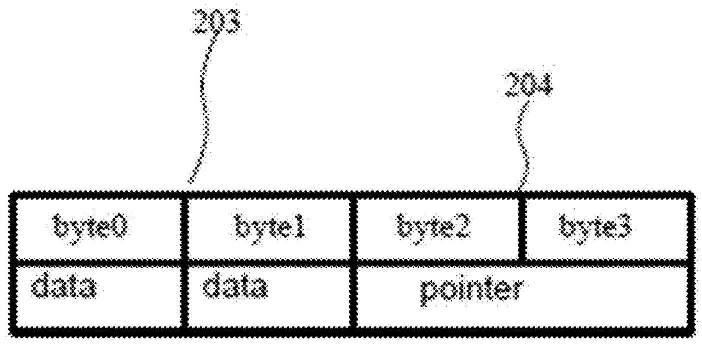
FIG. 3 is a schematic configuration diagram illustrating a storage block of a unit of a flash memory according to an embodiment of the present disclosure.

FIG. 3 is a schematic configuration diagram illustrating a storage block of a unit of a flash memory according to an embodiment of the present disclosure. Referring to FIG. 3, in this embodiment, each unit includes a data field 203 used for storing two bytes and an address field 204 used for storing two bytes of a pointer.

Figure 4:
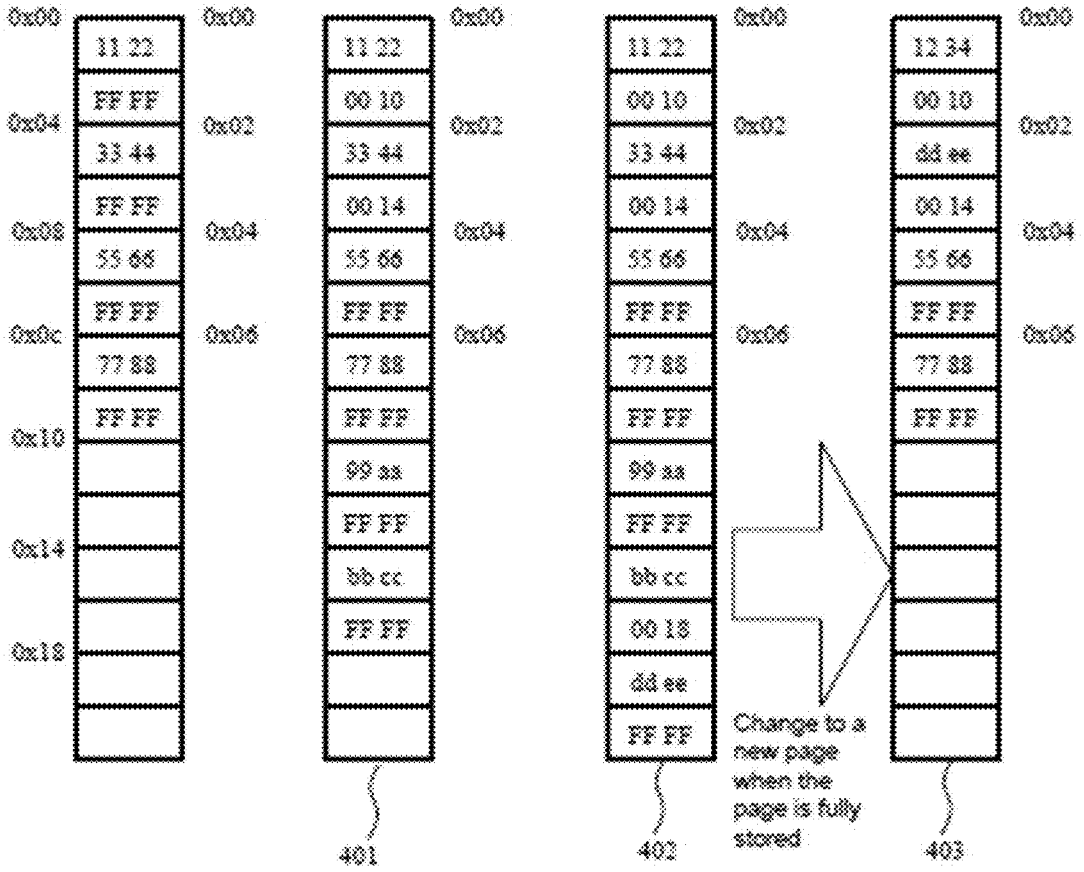
FIG. 4 is a schematic diagram illustrating a data storage of electrically-erasable programmable read-only memory emulated by using a flash memory according to an embodiment of the present disclosure.

FIG. 4 is a schematic diagram illustrating a data storage of electrically-erasable programmable read-only memory emulated by using a flash memory according to an embodiment of the present disclosure. Referring to FIG. 4, in this embodiment, the first 16 bytes of each page are set as the initial used addresses of the electrically-erasable programmable read-only memory. Four bytes are grouped to emulate two bytes of data. In FIG. 4, the left side represents the addresses of the flash memory, and the right side represents the addresses of the electrically-erasable programmable read-only memory. Initially, the emulated electrically-erasable programmable read-only memory is written with the initial data. The data in unit 0x00 is 1122h; the data in unit 0x04 is 3344h; the data in unit 0x08 is 5566h; and the data in unit 0x0c is 7788h. The flash memory addresses of units 0x00, 0x04, 0x08, and 0x0c correspond to the electrically-erasable programmable read-only memory addresses of units 0x00, 0x02, 0x04, and 0x06, respectively. Besides, the address field 204 of each of units 0x00, 0x04, 0x08, and 0x0c belongs to an unwritten state, and thus the internal data in the address field is ffffh.

When the control circuit 100 receives the instruction to modify the data in unit 0x00 of the electrically-erasable programmable read-only memory to 99aah, and to modify the data in unit 0x02 of the electrically-erasable programmable read-only memory to bbcch (as illustrated by reference numeral 401), the control circuit 100 writes 99aah into the address of unit 0x10 of the flash memory and writes bbcch into the address of unit 0x14 of the flash memory. Afterwards, the control circuit 100 adds 0010h to the address field 204 of the address of unit 0x00 of the flash memory, which represents that the updated data in unit 0x00 of the electrically-erasable programmable read-only memory is stored in the address of 0x10 of the flash memory. Additionally, the control circuit 100 adds 0014h to the address field 204 of the address of unit 0x04 of the flash memory, which represents that the updated data in unit 0x02 of the electrically-erasable programmable read-only memory is stored in the address of 0x14 of the flash memory.

When the control circuit 100 receives the instruction to modify the data in unit 0x02 of the electrically-erasable programmable read-only memory to ddeeh (as illustrated by reference numeral 402), the control circuit 100 writes ddeeh into the address of unit 0x18 of the flash memory. Afterwards, the control circuit 100 finds that the address field 204 of the address of unit 0x04 of the flash memory has been written. Accordingly, based on the written data 0014h, the control circuit 100 finds the address of unit 0x14 and determines that the address field 204 of unit 0x14 of the flash memory has not been written. This represents that unit 0x14 is the final data at last time in unit 0x02 of the electrically-erasable programmable read-only memory. Thus, the control circuit 100 writes 0018h into the address field 204 of unit 0x14, which represents that the latest data in unit 0x02 of the electrically-erasable programmable read-only memory is stored in unit 0x18.

According to the above embodiments, assuming that the control circuit 100 needs to read the data in unit 0x02 of the electrically-erasable programmable read-only memory, the control circuit 100 first finds the address field of unit 0x04 of the flash memory and determines whether it has been written. If it has been written, this represents that the data in the data field of unit 0x04 of the flash memory is not the latest data. Accordingly, the control circuit 100 finds the address field of unit 0x14 of the flash memory according to 0014h in the address field. Since the address field of unit 0x14 of the flash memory has also been written, the control circuit 100 finds the address field of unit 0x18 of the flash memory according to 0018h in the address field. Since the address field of unit 0x18 of the flash memory has not been written, this represents that the data in the data field of unit 0x18 of the flash memory is the latest data. Thus, the control circuit 100 reads this data ddeeh as the data in unit 0x02 of electrically-erasable programmable read-only memory.

Next, when the control circuit 100 receives the instruction to modify the data in unit 0x00 of the electrically-erasable programmable read-only memory to 1234h (as illustrated by reference numeral 403), the control circuit 100 finds that this page has been fully written with data. Accordingly, the control circuit 100 writes 1234h into 0x00 in a new page of the same sector 200. The control circuit 100 sequentially reads the corresponding data in addresses of units 0x02, 0x04, and 0x06 of the electrically-erasable programmable read-only memory and writes them into the data fields of units 0x04, 0x80, and 0x0c of the new page using the above methods. Afterwards, the control circuit 100 performs the erase operation on the page storing the old data.

Furthermore, since the capacity of conventional electrically-erasable programmable read-only memory is extremely small, the capacity of flash memory 101 is generally much larger than that of electrically-erasable programmable read-only memory. Thus, in the above embodiments, flash memory 101 has multiple sectors 200, and these sectors 200 may respectively emulate multiple electrically-erasable programmable read-only memories. Moreover, the read and write operations may be performed in the manner of serving the above-described address field as the memory address pointer.

Figure 5:
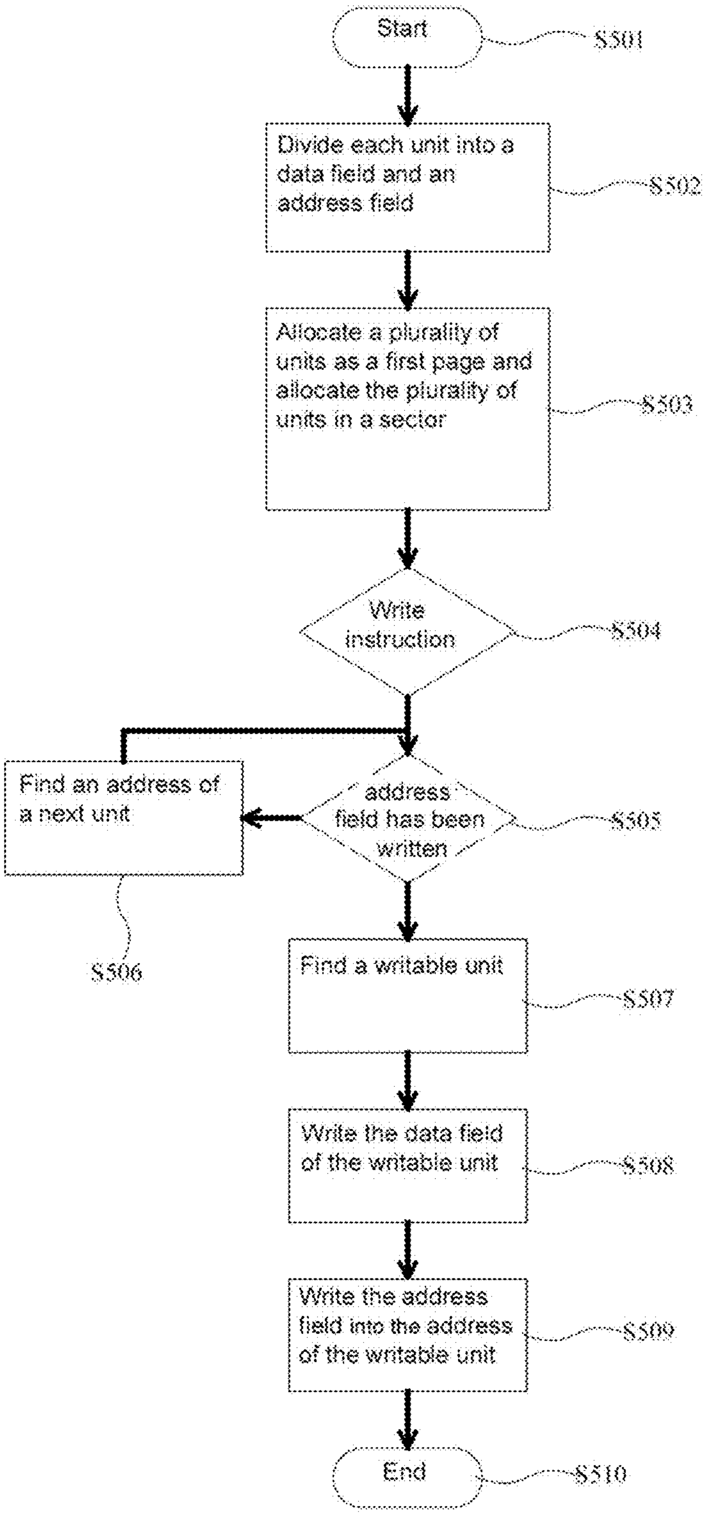
FIG. 5 is a schematic flowchart illustrating a writing method for emulating electrically-erasable programmable read-only memory by using a flash memory according to an embodiment of the present disclosure.

According to the above embodiments, this invention may be summarized as a method for emulating electrically erasable programmable read-only memory by using a flash memory. FIG. 5 is a schematic flowchart illustrating a writing method for emulating electrically-erasable programmable read-only memory by using a flash memory according to an embodiment of the present disclosure. Referring to FIG. 5, the writing method for emulating electrically-erasable programmable read-only memory by using a flash memory includes the following steps:

Step S501: Start.

Step S502: Divide each of units of a flash memory into a data field and an address field.

Step S503: Allocate a part of the units as a first page in a sector.

Step S504: Determine whether a write instruction is received. If the write instruction is received, proceed to Step S505.

Step S505: Determine, starting from the storage unit corresponding to the address of a page of the sector, whether one of the address fields of the units has been written. If written, proceed to Step S506. If not, proceed to Step S507.

Step S506: According to the address field, find an address of a next unit and return to Step S505. Repeat this step until a final unit is found, where the address field of the final unit has not been written.

Step S507: Find a writable unit, where both a data field and an address field of the writable unit have not been written. If the page is fully written, changing to a new page and finding a writable unit may be performed as described in the above embodiments.

Step S508: Write the data field of the above writable unit. If the page is fully written, changing to a new page, finding a writable unit, and moving data to the new page may be performed as described in the above embodiments.

Step S509: Write the address field of the final unit into the address of the above writable unit.

Step S510: End.

Figure 6:
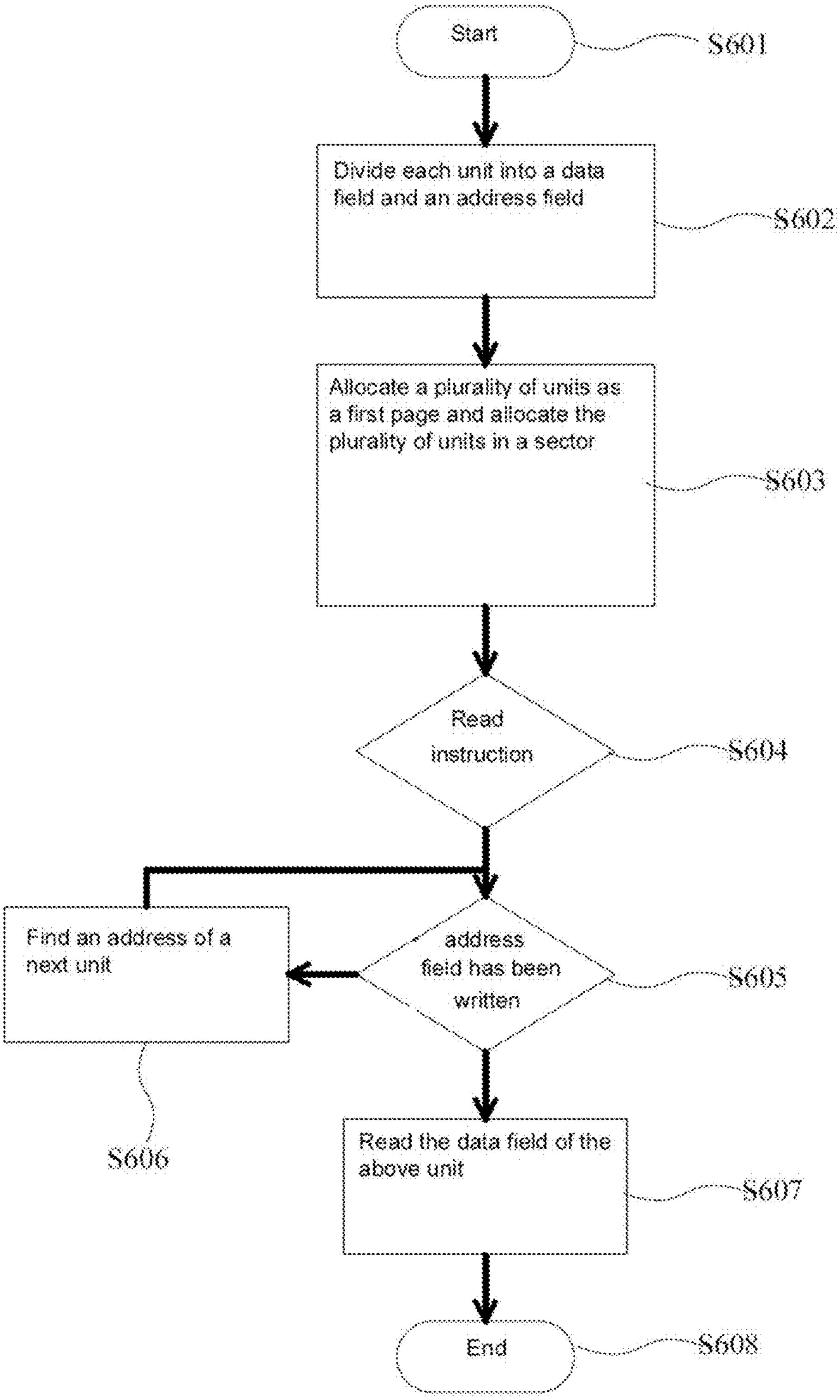
FIG. 6 is a schematic flowchart illustrating a reading method for emulating electrically-erasable programmable read-only memory by using a flash memory according to an embodiment of the present disclosure.

FIG. 6 is a schematic flowchart illustrating a reading method for emulating electrically-erasable programmable read-only memory by using a flash memory according to an embodiment of the present disclosure. Referring to FIG. 6, the reading method for emulating electrically-erasable programmable read-only memory by using a flash memory includes the following steps:

Step S601: Start.

Step S602: Divide each of units of a flash memory into a data field and an address field.

Step S603: Allocate a part of the units as a first page in a sector.

Step S604: Determine whether a read instruction is received. If the read instruction is received, proceed to Step S605.

Step S605: Determine, starting from the storage unit corresponding to the address of a page of the sector, whether the address field of the unit has been written. If written, proceed to Step S606. If not, proceed to Step S607.

Step S606: According to the address field, find an address of a next unit and return to Step S605. Repeat this step until a final unit is found, where the address field of the final unit has not been written.

Step S607: Read the data field of the above unit.

Step S608: End.

According to the above embodiments, if the plurality of electrically-erasable programmable read-only memories are to be emulated, multiple sectors of the flash memory may be respectively used as the emulated electrically-erasable programmable read-only memories.

To sum up, the embodiments of the present disclosure adopt, in flash memory, that the partition scheme originally used for electrically-erasable programmable read-only memory is applied in the addressing scheme of flash memory and that one data field and one address pointer field are allocated in each writable unit. When the address pointer field is in a written state, it represents that the data in the data field is not the latest written data. In this situation, it only requires continuously searching for the address of the address pointer field until a unit is found. The address pointer field of this unit has not been written, which represents that the data in the data field of this unit is the latest data. This allows emulating the memory allocation of electrically-erasable programmable read-only memory while reducing the number of times to erase the entire page in the flash memory, thereby extending its lifespan.

It should be understood that the examples and the embodiments described herein are for illustrative purpose only, and various modifications or changes in view of them will be suggested to those skilled in the art, and will be included in the spirit and scope of the application and the appendix with the scope of the claims.

What is claimed is:

1. A method for emulating electrically-erasable programmable read-only memory by using a flash memory, the method comprising:

dividing each of units of the flash memory into a data field and an address field;

allocating a part of the units as a first page in a sector;

wherein in response to an instruction to write data into a first specific storage unit of the sector, the method comprises:

determining, starting from the first specific storage unit of the first page of the sector, whether each of the address fields of the units of the first page has been written;

when one of the address fields is in a written state, finding a next unit based on the one of the address fields until a final unit is found, wherein an address of the next unit is data written in the one of the address fields, and wherein an address field of the final unit has not been written;

finding a writable unit, wherein both a data field and an address field of the writable unit have not been written;

writing the data into the data field of the writable unit and writing the address field of the final unit into the address of the writable unit;

wherein in response to the instruction to read a second specific storage unit of the sector, the method further comprises:

determining, starting from the second specific storage unit of an initial page of the sector, whether one of the address fields of the units of the initial page has been written;

when the one of the address fields is in a written state, finding a next unit based on the one of the address fields until a target unit is found, wherein an address field of the target unit has not been written; and reading a data field of the target unit;

allocating at least one second page in the sector;

wherein in response to the instruction to write the second specific storage unit of the sector, the method further comprises:

when the first page is fully stored, finding a unit of the second page, wherein an address field of the unit of the second page has not been written; and writing a data field of the found unit of the second page.

2. The method according to claim 1, wherein the flash memory is a NAND flash memory built in a microprocessor.

3. The method according to claim 1, wherein the method is further used for writing multiple emulated electrically-erasable programmable read-only memories and the method further comprises:

providing a plurality of sectors corresponding to addresses of the multiple emulated electrically-erasable programmable read-only memories.

4. A method for emulating electrically-erasable programmable read-only memory by using a flash memory, the method comprising:

dividing each of units of the flash memory into a data field and an address field;

allocating a part of the units as a first page in a sector;

wherein in response to an instruction to read a first specific storage unit of the sector, the method comprises:

determining, starting from the first specific storage unit of the first page of the sector, whether one of the address fields of the units has been written;

when the one of the address fields is in a written state, finding a next unit based on the one of the address fields until a target unit is found, wherein an address of the next unit is data written in the one of the address fields, and wherein an address field of the target unit has not been written;

reading the data field of the target unit;

wherein in response to the instruction to read a second specific storage unit of the sector, the method further comprises:

determining, starting from the second specific storage unit of an initial page of the sector, whether one of the address fields of the units of the initial page has been written;

when the one of the address fields is in a written state, finding a next unit based on the one of the address fields until a target unit is found, wherein an address field of the target unit has not been written; and reading a data field of the target unit;

wherein in response to the instruction to write data into the second specific storage unit of the sector, the method comprises:

determining, starting from the second specific storage unit of the first page of the sector, whether one of the address fields of the units has been written;

if the one of the address fields is in a written state, finding a next unit based on the one of the address fields until a final unit is found, wherein an address field of the final unit has not been written;

finding a writable unit, wherein both a data field and an address field of the writable unit have not been written;

writing the data into the data field of the writable unit and writing the address field of the final unit into the address of the writable unit;

allocating at least one second page in the sector;

when the first page is fully stored, finding a unit of the second page, wherein an address field of the unit of the second page has not been written; and writing a data field of the found unit of the second page.

5. The method according to claim 4, further comprising:

allocating at least one second page in the sector;

wherein in response to the instruction to write the second specific storage unit of the sector, the method further comprises:

when the first page is fully stored, finding a unit of the second page, wherein an address field of the unit of the second page has not been written; and writing a data field of the found unit.

6. The method according to claim 4, wherein the flash memory is a NAND flash memory built in a microprocessor.

7. The method according to claim 4, wherein the method is further used for reading multiple emulated electrically-erasable programmable read-only memories and the method further comprises:

providing a plurality of sectors corresponding to addresses of the multiple emulated electrically-erasable programmable read-only memories.

8. A flash memory system, comprising:

a control circuit; and a flash memory, each of units of the flash memory being divided into a data field and an address field, and a part of the units being allocated as a first page in a sector, wherein:

when the control circuit receives an instruction to write data into a first specific storage unit of the sector, the control circuit determines, starting from the first specific storage unit of an initial page of the sector, whether one of the address fields of the unit has been written;

when the control circuit determines that the one of the address fields is in a written state, the control circuit finds a next unit based on the one of the address fields until a final unit is found, wherein an address of the next unit is data written in the one of the address fields, and wherein an address field of the final unit has not been written;

the control circuit finds a writable unit, wherein both a data field and an address field of the writable unit have not been written;

the control circuit writes the data into the data field of the writable unit and writes the address field of the final unit into the address of the writable unit;

when the control circuit receives the instruction to read a second specific storage unit of the sector, the control circuit determines, starting from the second specific storage unit of an initial page of the sector, whether one of the address fields of the units of the initial page has been written;

when the one of the address fields is in a written state, the control circuit finds a next unit based on the one of the address fields until a target unit is found, wherein an address field of the target unit has not been written; and the control circuit reads a data field of the target unit;

the control circuit allocates at least one second page in the sector;

when the control circuit receives the instruction to write the second specific storage unit of the sector, when the first page is fully stored, the control circuit finds a unit of the second page, wherein an address field of the unit of the second page has not been written; and the control circuit writs a data field of the found unit of the second page.

9. The flash memory according to claim 8, wherein the flash memory is a NAND flash memory, and the flash memory system further comprises a microprocessor having the control circuit and the NAND flash memory.

10. The flash memory according to claim 8, wherein the flash memory is provided with a plurality of sectors for emulating multiple emulated electrically-erasable programmable read-only memories.

* * * * *